April 9, 1935.    H. T. HERR    1,997,299
TRANSPORTATION APPARATUS
Filed July 18, 1933    2 Sheets-Sheet 1

WITNESSES:
James K. Mosser
E. Lutz

INVENTOR
HERBERT T. HERR
BY  A. B. Reavis
ATTORNEY

April 9, 1935.  H. T. HERR  1,997,299
TRANSPORTATION APPARATUS
Filed July 18, 1933   2 Sheets-Sheet 2

WITNESSES:
James K. Mosser
E. Lutz

INVENTOR
HERBERT T. HERR
BY a. B. Reavis
ATTORNEY

Patented Apr. 9, 1935

1,997,299

UNITED STATES PATENT OFFICE 1,997,299

TRANSPORTATION APPARATUS

Herbert T. Herr, Philadelphia, Pa., assignor to Westinghouse Electric & Manufacturing Company, East Pittsburgh, Pa., a corporation of Pennsylvania Application July 18, 1933, Serial No. 681,018

8 Claims. (Cl. 105—35)

My invention relates to transportation apparatus of the internal combustion engine type wherein power is transmitted from the engine to the propulsion means through the intermediary of an electrical transmission including a generator driven by the engine and propulsion motors connected to the generator and driving the propulsion means, and it has for an object to provide improved means of circulating air through such parts of the apparatus as may require cooling.

In accordance with a particular application of my invention, I provide the locomotive or tractor with a closed cab within which is located the internal combustion engine and the generator driven thereby as well as any suitable auxiliary apparatus. The traction motor or motors are arranged externally of the cab in the usual way. The cab is maintained with air under super-atmospheric pressure by a blower and the air outlets leading from the cab include the spaces of the generator and of the motor or motors requiring ventilation, the engine radiator, and such other apparatus as may require cooling. If a two-cycle engine is employed, super-atmospheric pressure of air maintained in the cab is advantageous from the point of view of being the first stage of compression for the scavenging and supercharging air. If a four-cycle engine is employed, it is supercharged. Also, this arrangement removes the engine from the influence of changing external atmospheric conditions, for the air pressure in the cab may be maintained substantially constant with variation in outside pressure incident to altitude changes; and, therefore, the power output of the engine may be maintained substantially constant at various altitudes. A more particular object of my invention is, therefore, to provide a locomotive having these advantageous features of construction and of operation.

These and other objects are effected by my invention, as will be apparent from the following description and claims taken in connection with the accompanying drawings, forming a part of this application in which:

Figure 1:
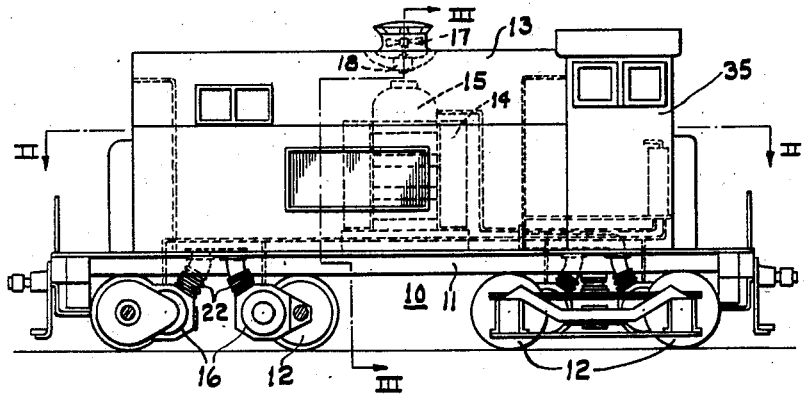
Fig. 1 is a side elevational view of my improved locomotive.
Figure 2:
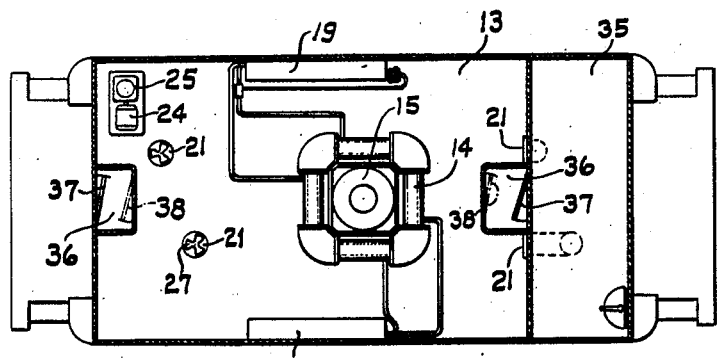
Fig. 2 is a plan sectional view taken along the line II—II of Fig. 1.
Figure 3:
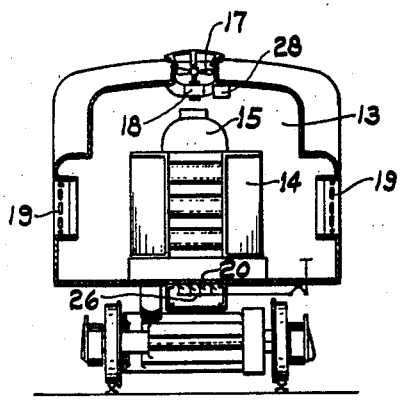
Fig. 3 is a transverse sectional view taken along the line III—III of Fig. 1.
Figure 5:
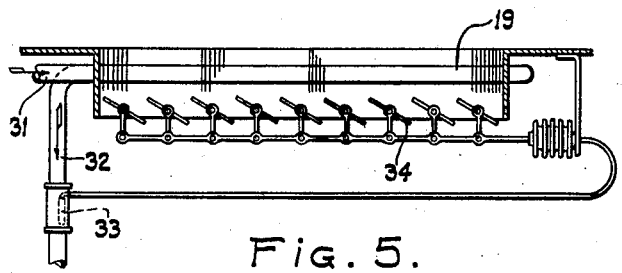
Fig. 5 is a detail view, of the engine radiator showing means for adjusting air flow therethrough.
Figure 6:
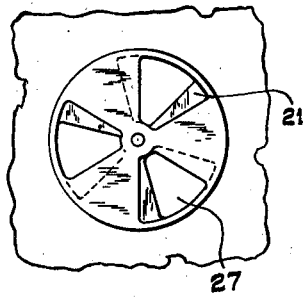
Fig. 6 is a detail view of one of the air dampers.
Figure 7:
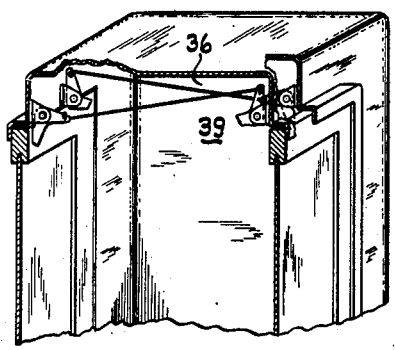
Fig. 7 is a detail view showing interlocked cab doors.
Figure 4:
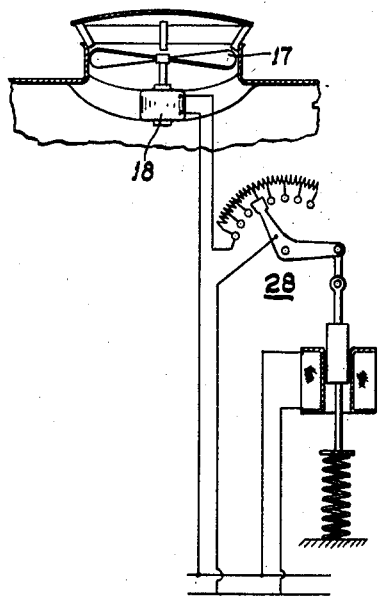
Fig. 4 is a detail view showing speed control mechanism for the blower motor.

Referring to the drawings more in detail, transportation apparatus, for example, a locomotive, at 10, is provided with the usual frame 11 and propulsion means such as traction wheels 12. The frame carries a closed compartment or cab 13 within which is arranged an internal combustion engine 14 driving the generator 15. Traction motors 16 are arranged externally of the cab, are connected electrically to the generator, 15 and drive the traction wheels 12.

Super-atmospheric pressure of air of the order of 6 or 8 inches of water or any desired pressure is maintained in the cab 13 by a blower 17 of any suitable type driven by the electric motor 18. Egress of air from the cab is restricted through the spaces of the generator 15 and of the motors 16 requiring ventilation and through the radiator or radiators 19 for the engine circulating water or any other medium requiring heat interchange. To this end, it will be seen that the floor of the cab is provided with an opening 20 through which air may be discharged after passage through the ventilating space of the generator from the interior of the cab. The floor of the cab is also provided with openings 21 connected by conduits 22 to the traction motors so that air may pass from the cab interior through the conduits and the ventilating spaces of the motor to the outside. In like manner, the motor 24 for driving the air compressor 25 has its ventilating space arranged to discharge air from the interior of the cab through an opening in the cab floor. Thus it will be seen that all parts of the locomotive requiring cooling may be cooled by air supplied from a single source, namely, the closed cab. The openings 20 and 21 are provided with dampers 26 and 27, respectively, so that air flow may be properly controlled.

Changes in load entail changes in the amount of heat to be dissipated. Accordingly, the blower motor 18 has its speed controlled in accordance with the locomotive load, increases in load resulting in increases in blower speed and vice versa. Therefore, I employ controller mechanism, at 28, responsive to generator output for controlling the blower motor speed. The blower motor 18 may also be controlled in proportion to the temperature of the engine cooling water or other heat exchanger, or controlled both as to load and temperature.

I prefer to arrange the blower or blowers 17 in the roof of the locomotive and to locate the radiators 19 in side walls thereof; however, it is to be understood that these and other parts may be located in any suitable manner in effecting the purposes of the present invention.

The radiators 19 are connected to the jacket spaces of the engine by the inlet and outlet conduits 31 and 32; and, in order to maintain a substantially uniform temperature of engine circulating water, I provide thermostats 33 in the outlets 32 controlling adjusting regulators 34 to control the passage of air through the radiators 19.

A vestibule 35 is arranged beyond one end of the cab and encloses the control equipment as well as space for the engine man.

Access to the cab 13 is had by air locks 36 provided with double doors 37 and 38, the doors being interlocked by any suitable mechanism, at 39, so that both doors of a pair cannot be opened at the same time, thereby minimizing the escape of air due to entrance and exit from the cab.

Where the engine 14 is of the two-cycle type, it is necessary to supply scavenging and supercharging air, and the present construction is advantageous in that the pressure of air in the cab may be regarded as the first stage of compression for the scavenging or supercharging air, it being understood, of course, that a blower must be provided to build up the scavenging or supercharging air to a higher pressure than that existing in the cab. Also, as the air in the cab is at superatmospheric pressure, better operation of the compressor 25 is secured, and similarly when a four-cycle engine is used to furnish the motive power.

As the cab or compartment has maintained therein air under superatmospheric pressure, it will be apparent that operation of the engine is rendered independent of outside atmospheric conditions, whereby the locomotive may be operated at different altitudes under substantially uniform power output conditions, the blower being adjusted to compensate for the differential existing between the interior and the exterior of the cab so as to maintain the interior pressure substantially constant.

While I have particularly described my invention as applied to a railway locomotive, it will be apparent that it may be used with any suitable transportation apparatus, as the invention is concerned primarily with the provision of improved means for supplying air to parts of the installation. Also, while the invention may be embodied with any suitable type of engine, a peculiar degree of operation exists when the engine is of the internal combustion type, for, with an engine of that type, air is required for two purposes, i. e., to effect combustion, and to provide for cooling of the engine circulating water. Therefore, when mention is made herein to passage of air from the cab or compartment to the engine, it is to be understood that this refers to air supplied to the engine for either or both of these purposes.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In transportation apparatus, a compartment, an internal combustion engine in the compartment, a generator driven by the engine and disposed in the compartment, one or more propulsion motors arranged externally of the compartment, means providing passages connecting the interior of the compartment with space external thereto and including the generator and motor cooling spaces, and a blower for maintaining air under super-atmospheric pressure in the compartment.

2. The combination as claimed in claim 1 with radiator means for cooling the engine circulating water and supplied with air from the compartment.

3. The combination as claimed in claim 1 wherein the blower is controlled in accordance with the generator load.

4. The combination as claimed in claim 1 with an air lock including double doors affording access to the compartment.

5. In transportation apparatus having propulsion motor means, a compartment, an engine in the compartment and requiring air for its proper operation, a generator driven by the engine and connected to propulsion motor means, said generator and the motor means having air cooling passages, means for maintaining air in the compartment under super-atmospheric pressure, and means providing for passage of air from the compartment to the engine and from the compartment through said cooling passages of the generator and of the motor means.

6. In transportation apparatus having propulsion motor means, a compartment, an engine in the compartment and requiring air for its proper operation, a generator driven by the engine and connected to propulsion motor means, said generator and the motor means having air cooling passages, a blower for translating air from the exterior of the compartment to the interior thereof to maintain air in the compartment under super-atmospheric pressure, and means providing for passage of air from the compartment to the engine and to the generator and motor means cooling passages.

7. The combination as claimed in claim 6 wherein the blower output is varied in accordance with the generator load.

8. In a railway vehicle, a frame, traction wheels supporting the frame, means cooperating with the frame to provide a compartment, apparatus for generating and transmitting power to the traction wheels and including a prime mover in the compartment, said apparatus requiring air in its operation and the portion or portions thereof requiring air having passages opening into the compartment, and means for maintaining air in the compartment at sufficient pressure to supply said passages.

HERBERT T. HERR.